United States Patent
Nunn et al.

(10) Patent No.: US 10,663,354 B2
(45) Date of Patent: May 26, 2020

(54) TEMPERATURE MEASUREMENT DEVICE

(71) Applicant: BAE Systems plc, London (GB)

(72) Inventors: Stephen Charles Nunn, Preston (GB); Matthew Lang, Preston (GB)

(73) Assignee: BAE Systems plc, London (GB)

( * ) Notice: Subject to any disclaimer, the term of this patent is extended or adjusted under 35 U.S.C. 154(b) by 214 days.

(21) Appl. No.: 15/762,728

(22) PCT Filed: Sep. 27, 2016

(86) PCT No.: PCT/GB2016/052993
§ 371 (c)(1),
(2) Date: Mar. 23, 2018

(87) PCT Pub. No.: WO2017/055821
PCT Pub. Date: Apr. 6, 2017

(65) Prior Publication Data
US 2018/0283961 A1  Oct. 4, 2018

(30) Foreign Application Priority Data

Sep. 29, 2015 (EP) .................................... 15187432
Sep. 29, 2015 (GB) .................................. 1517191.1

(51) Int. Cl.
*G01K 1/00* (2006.01)
*G01K 13/00* (2006.01)
(Continued)

(52) U.S. Cl.
CPC ............. *G01K 1/143* (2013.01); *B64D 43/00* (2013.01); *G01K 2007/422* (2013.01)

(58) Field of Classification Search
USPC ........................................ 374/141, 142, 208
See application file for complete search history.

(56) References Cited

U.S. PATENT DOCUMENTS 10,088,251 B2 * 10/2018 Raman ..................... F28F 13/18
2010/0121217 A1 * 5/2010 Padiy ......................... G01K 1/16
                                                                    600/549
2014/0254102 A1   9/2014 Paielli et al.

FOREIGN PATENT DOCUMENTS

EP           2982941 A1    2/2016
JP         S60169727 A1    9/1985
(Continued)

OTHER PUBLICATIONS

International Preliminary Report on Patentability of International Application No. PCT/GB2016/052993, dated Apr. 12, 2018, 8 pages.
(Continued)

*Primary Examiner* — Mirellys Jagan
(74) *Attorney, Agent, or Firm* — Maine Cernota & Rardin (57) ABSTRACT

Disclosed is a temperature measurement device (4) and method of using the same. The device (2) comprises a base portion (14), a plate (16), and a temperature sensor (22). The base portion (14) comprises a first surface and a second surface opposite to the first surface and spaced apart from the first surface. The base portion (14) is more thermally insulating than the plate (16). The plate (16) comprises a first surface and a second opposite to the first surface. The plate (16) is disposed on the first surface of the base portion (14) such that the second surface of the plate (16) is in contact with the first surface of the base portion (14). The temperature sensor (22) is coupled to the first surface of the plate (16) such that the temperature sensor (22) measures a temperature of the first surface of the plate (16).

13 Claims, 4 Drawing Sheets

(51) Int. Cl.
*G01K 1/14* (2006.01)
*B64D 43/00* (2006.01)
*G01K 7/42* (2006.01)

(56) References Cited

FOREIGN PATENT DOCUMENTS

| WO | 2005026017 A1 | 3/2005 |
| WO | 2008074917 A1 | 6/2008 |
| WO | 2014204383 A1 | 12/2014 |

OTHER PUBLICATIONS

International Search Report and Written Opinion of International Application No. PCT/GB2016/052993, dated Oct. 28, 2016, 12 pages.
Search Report under Section 17(5) of Great Britain Application No. GB1517191.1, dated Mar. 22, 2016, 3 pages.
Extended European Search Report of European Application No. EP15187432-8, dated Mar. 11, 2016, 7 pages.

\* cited by examiner

TEMPERATURE MEASUREMENT DEVICE

RELATED APPLICATIONS

This application is a national phase application filed under 35 USC § 371 of PCT Application No. PCT/GB2016/052993 with an International filing date of Sep. 27, 2016 which claims priority of GB Patent Application 1517191.1 filed Sep. 29, 2015 and EP Patent Application 15187432.8 filed Sep. 29, 2015. Each of these applications is herein incorporated by reference in its entirety for all purposes.

FIELD OF THE INVENTION

The present invention relates to temperature measurement devices.

BACKGROUND

Aircraft exposed to the elements are vulnerable to deterioration and damage caused by weather phenomena.

For example, freezing temperatures may cause water on or within the skin of the aircraft to expand, thereby forming cracks in the aircraft external skin and reducing the integrity and life of the aircraft.

Also for example, constant thermal change to the carbon fibre composite external skin and paint, and/or other aircraft material caused by heating and cooling cycles introduces stress to the exterior of the aircraft. This can reduce the integrity and life of the aircraft.

Conventionally, temperatures and weather conditions to which an aircraft is exposed is monitored using, for example, a thermometer.

SUMMARY OF THE INVENTION

The inventors have realised that the temperature of the air to which the aircraft is exposed is not necessarily the same as the temperature of the aircraft skin. In addition to being affected by the air temperature of the environment, the aircraft skin tends to experience radiative heat loss to (or gains from) the environment. The inventors have recognised a need for taking into account such radiative heating. The inventors have further realised that it would be beneficial for a temperature measurement device to be able to forward predict the temperature of the aircraft skin, thereby allowing for pre-emptive action to be performed.

In a first aspect, the present invention provides a temperature measurement device for indicating a temperature associated with an object. For example, the temperature measurement device for may be for estimating or predicting a current or future temperature of the object. The temperature measurement device comprises: a base portion; a plate; and a temperature sensor. The base portion comprises a first surface and a second surface opposite to the first surface, and one or more side walls disposed between the first surface and the second surface such that the first surface is spaced apart from the second surface. The base portion is more thermally insulating than the plate. The plate comprises a first surface and a second opposite to the first surface. The plate is disposed on the first surface of the base portion such that the second surface of the plate is in contact with the first surface of the base portion. The temperature sensor is coupled to the first surface of the plate such that the temperature sensor measures a temperature at the first surface of the plate. An emissivity of the first surface of the plate is greater than or equal to an emissivity of the object.

The first surface of the plate may have an emissivity value of at least 0.8, at least 0.9, or more preferably at least 0.95. The temperature measurement device may be configured to output an alert responsive to the temperature sensor measuring a temperature below a threshold temperature. The first surface of the plate may be at least partially coated with a black coating. The base portion may comprise a plastic. The plate may comprise a metal. The object may comprise at least part of an external skin of an aircraft. The temperature measurement device may further comprise one or more processors coupled to the temperature sensor. The one or more processors may be configured to: compare an output of the temperature sensor to a predetermined threshold temperature; and provide, based on the comparison, for use by a user, an output.

In a further aspect, the present invention provides a system comprising a temperature measurement device according to the preceding aspect, and the object. The object may be remote from, i.e. not in direct contact with, the temperature measurement device.

In a further aspect, the present invention provides a method of measuring a temperature associated with an object. For example, the method may measure a temperature that provides an estimation or prediction for a current or future temperature of the object. The method comprises: providing a base portion having a first surface and a second surface opposite to the first surface, and one or more side walls disposed between the first surface and the second surface such that the first surface is spaced apart from the second surface; providing a plate having a first surface and a second opposite to the first surface, wherein the base portion is more thermally insulating than the plate and wherein an emissivity of the first surface of the plate is greater than or equal to an emissivity of the object; fixing the plate to the base portion such that the second surface of the plate is in contact with the first surface of the base portion; coupling a temperature sensor to the first surface of the plate, thereby providing a temperature measurement device; and measuring, by the temperature sensor, a temperature at the first surface of the plate.

The method may further comprise: prior to the step of measuring, positioning the temperature measurement device in an environment; comparing a measurement taken by the temperature sensor to a predetermined threshold temperature; and providing, based on the comparison, an output. The environment may contain the object. The object may be at least part of an external skin of an aircraft. The provided output may be an indication of whether or not the object should be removed from the environment. The predetermined threshold temperature may be dependent upon a time period for removing the object from the environment. The method may further comprise: measuring a wind speed in the environment; and measuring cloud cover in the environment. The predetermined threshold temperature may be dependent upon the measured wind speed and cloud cover.

In a further aspect, the present invention provides a temperature measurement device comprising a base portion, a plate, and a temperature sensor. The base portion comprises a first surface and a second surface opposite to the first surface, and one or more side walls disposed between the first surface and the second surface such that the first surface is spaced apart from the second surface. The base portion is relatively thermally insulating. The plate is relatively thermally conductive. The plate comprises a first surface and a second opposite to the first surface. The plate is disposed on the first surface of the base portion such that the second surface of the plate is in contact with the first surface of the base portion. The temperature sensor is coupled to the first surface of the plate such that the temperature sensor measures a temperature of the first surface of the plate.

The first surface of the plate may have an emissivity value of at least 0.8. More preferably, the first surface of the plate has an emissivity value of at least 0.9. More preferably, the first surface of the plate has an emissivity value of at least 0.95.

The first surface of the plate may be at least partially coated with a black coating, for example black paint.

The base portion may be made of a plastic, for example, a plastic foam.

The plate may be made of metal.

In a further aspect, the present invention provides a system comprising a temperature measurement device according to any of the above aspects, and an object. An emissivity of the first surface of the plate is greater than or equal to an emissivity of the object.

The object may be at least part of an external skin of an aircraft.

The system may further comprise one or more processors coupled to the temperature sensor. The one or more processors may be configured to compare an output of the temperature sensor to a predetermined threshold temperature, and provide, based on the comparison, for use by a user, an output.

In a further aspect, the present invention provides a method of measuring a temperature. The method comprises: providing a base portion, the base portion comprising a first surface and a second surface opposite to the first surface, and one or more side walls disposed between the first surface and the second surface such that the first surface is spaced apart from the second surface; providing a plate, the plate comprising a first surface and a second opposite to the first surface; fixing the plate to the base portion such that the second surface of the plate is in contact with the first surface of the base portion; coupling a temperature sensor to the first surface of the plate, thereby providing a temperature measurement device; and measuring, by the temperature sensor, a temperature of the first surface of the plate.

The method may further comprise: prior to the step of measuring, positioning the temperature measurement device in an environment; comparing a measurement taken by the temperature sensor to a predetermined threshold temperature; and providing, based on the comparison, an output.

The environment may contain an object (e.g. at least part of an external skin of an aircraft). The provided output may be an indication of whether or not the object should be removed from the environment.

The predetermined threshold temperature may be dependent upon a time period for removing the object from the environment.

The method may further comprise measuring a wind speed in the environment, and measuring cloud cover in the environment. The predetermined threshold temperature may be dependent upon the measured wind speed and cloud cover.

DETAILED DESCRIPTION

Figure 1:
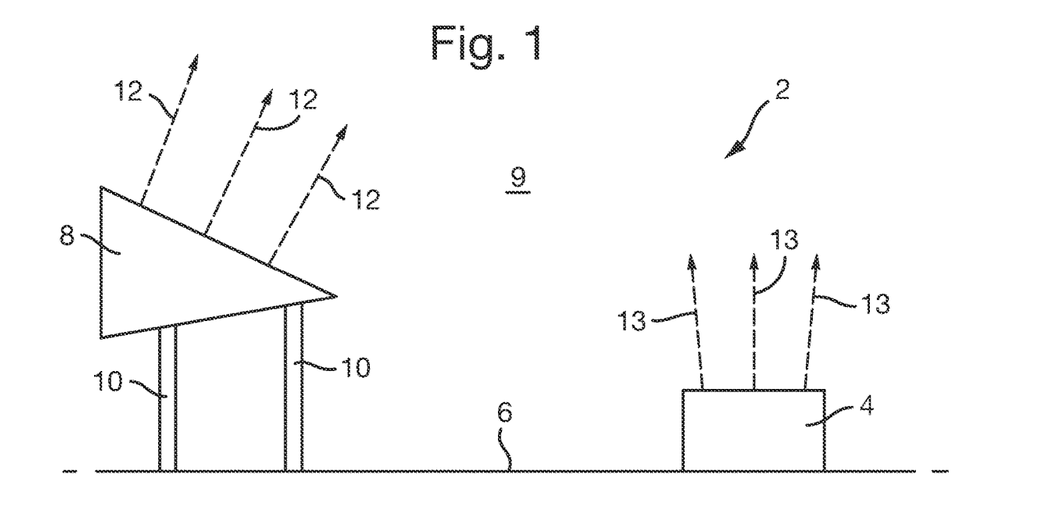
FIG. 1 is a schematic illustration (not to scale) showing an environment in which a temperature measurement device is implemented.

FIG. 1 is a schematic illustration (not to scale) showing an environment 2 in which an embodiment of a temperature measurement device 4 is implemented. The temperature measurement device 4 will be described in more detail later below with reference to FIG. 2.

In this embodiment, the temperature measurement device 4 is located on the ground 6. The temperature measurement device 4 is located in the vicinity of an aircraft 8. The aircraft 8 is held above the ground 6 by a plurality of supports 10. In this embodiment, the aircraft 8 comprises an outer skin made of a carbon fibre composite.

In this embodiment, the environment 2 is such that the temperature measurement device 4 and the aircraft 8 are exposed to weather phenomena, i.e. the aircraft 8 and the temperature measurement device 4 are outdoors and uncovered. Air temperature in the environment 2 may vary, for example, air temperature in the environment 2 may drop to below 0° C.

In this embodiment, the environment 2 is such that the temperature measurement device 4 and the aircraft 8 are exposed to the night sky 9.

The aircraft 8 generally tends to experience a net loss of heat to the environment 2 (towards the night sky 9) by radiative cooling. Therefore, the temperature of the external skin of the aircraft 8 tends to be lower than the air temperature of the environment 2. Heat radiated by the external skin of the aircraft 8 to space (i.e. towards the night sky 9) is indicated in FIG. 1 by dotted arrows and the reference numeral 12.

Due to radiative cooling, the temperature of the external skin of the aircraft 8 may be below the air temperature of the environment 2. The temperature of the external skin of the aircraft 8 dropping below a threshold temperature may damage the aircraft skin. For example, the outer skin of the aircraft 8 being at or below 0° C. may cause ice to form between layers of the external skin of the aircraft 8, which may cause cracks in the aircraft skin to form.

The temperature measurement system 4 also tends to lose heat to space, towards the night sky 9, in a similar way to the external skin of the aircraft 8. Radiative heat loss from the temperature measurement device 4 is indicated in FIG. 1 by dotted arrows and the reference number 13.

The night sky 9 may be, for example, completely obscured by clouds, only partially obscured by clouds, or clear (i.e. substantially cloud-free). These states of cloud cover will be described in more detail later below with reference to FIG. 5.

The interaction of the temperature measurement device 4 and the aircraft 8 with the night sky 9 will be described in more detail later below with respect to FIGS. 2 to 5.

Figure 2:
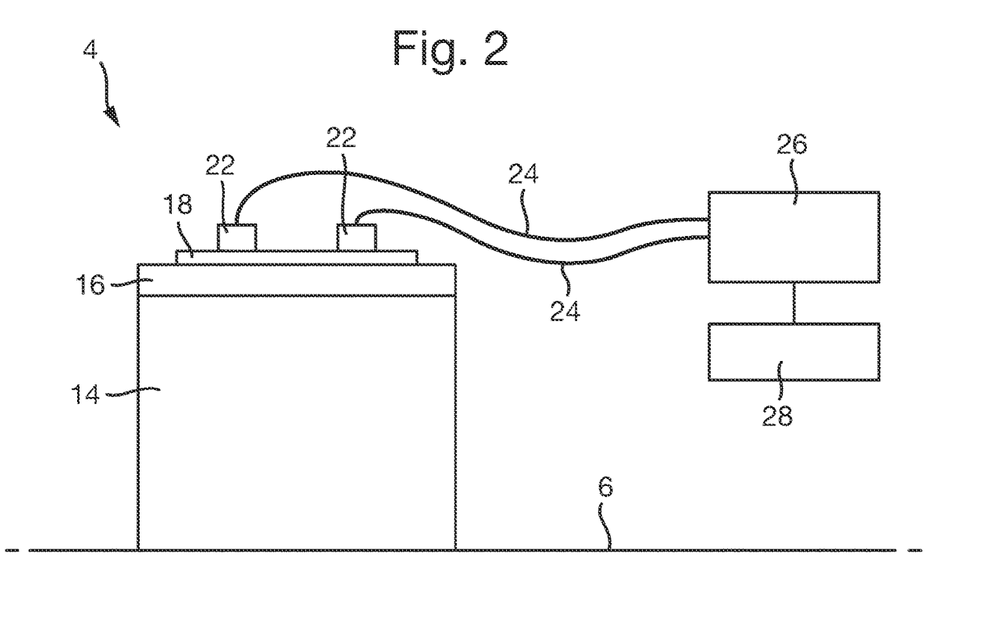
FIG. 2 is a schematic illustration (not to scale) of the temperature measurement device.

FIG. 2 is a schematic illustration (not to scale) of the temperature measurement device 4.

In this embodiment, the temperature measurement device 4 comprises a base portion 14, a plate 16, a coating 18, two thermocouples 22, two wires 24, a processor 26 and a display 28.

In this embodiment the base portion 14 is made of a thermal insulator, such as polystyrene. The base portion 14 is substantially cube shaped, for example, a 30 cm×30 cm×30 cm cube. The base portion 14 comprises an upper surface and a lower surface, the lower surface being opposite to the upper surface. The lower surface of the base portion 14 is in contact with the ground 6.

In this embodiment the plate 16 is made of a thermally conductive material such as a metal, for example, aluminium. The plate 16 has an upper surface and a lower surface, the lower surface being opposite to the upper surface. The thickness of the plate 16 (i.e. a distance between the upper and lower surfaces of the plate 16) is between 1 mm and 2 mm. The plate 16 is disposed on the upper surface of the base portion 14 such that the lower surface of the plate 16 is fixedly attached to the upper surface of the base portion 14. Thus, the plate 16 is separated from the ground 6 by the base portion 14. Thus, the base portion 14 thermally insulates the plate 16 from the ground 6 at least to some extent. The thermal insulation provided by the base portion 14 to the plate 16 in this embodiment tends to be very effective. In this embodiment, the upper surface of the plate 16 is positioned towards, or facing, the night sky 9.

In this embodiment, the coating 18 is a layer of high emissivity paint, for example a black paint. However, in other embodiments, the coating 18 may be a different type of coating. In this embodiment, the coating 18 is disposed on the upper surface of the plate 16.

In this embodiment, the coating 18 has a higher emissivity value than the outer skin of the aircraft 8. Thus, the coating 18 tends to be more effective at emitting thermal radiation to space than the outer skin of the aircraft 8. The emissivity of a surface or material is the ratio of the thermal radiation from a surface to the radiation from an ideal black body surface at the same temperature. In this embodiment, the emissivity of the coating 18 is between 0.9 and 0.97. However, in other embodiments, the coating 18 has a different emissivity. Preferably, the emissivity of the coating 18 is at least 0.7. More preferably, the emissivity of the coating 18 is at least 0.8. More preferably, the emissivity of the coating 18 is at least 0.9. Preferably, the coating 18 has an emissivity value of as close to 1 as possible. However, in other embodiments, the emissivity of the coating 18 is the same as the emissivity of the external skin of the aircraft 8.

The thermocouples 22 are fixed to the upper surface of the coating 18, at or proximate to the centre of the upper surface of the plate 16. The thermocouples 22 are configured to measure a temperature of the centre of the upper surface of the plate 16.

The thermocouples 22 are bonded to the plate 16 via an adhesive having a high thermal conductivity.

The thermocouples 22 are coupled to the processor 26 by the wires 24 such that electrical signals corresponding to the temperature measurements taken by the thermocouples 22 may be sent to the processor 26 from the thermocouples 22.

The processor 26 is configured to process the electrical signal received from the thermocouples 22 as described in more detail later below with reference to FIGS. 3 and 4. The processor 26 is coupled to the display 28 such that a signal may be sent from the processor 26 to the display 28.

The display 28 is configured to display an output of the processor 26, for example, to a human operator.

In operation, the upper surface of the plate 16 and the coating 18 lose heat to space (towards the night sky 9) via radiative cooling, as indicated in FIG. 1 by dotted arrows 13. Due, at least in part, to the coating 18 having a higher emissivity value than the outer skin of the aircraft 8, the plate 16 and the coating 18 tend to be more effective at losing heat by radiative cooling than the outer skin of the aircraft 8. Thus, the plate 16 will tend to cool at a faster rate than the outer skin of the aircraft 8. Thus, a drop in temperature of the outer skin of the aircraft 8 below a threshold temperature can be predicted using the measured temperature of the plate 16. This prediction advantageously tends to allow a human operator to pre-emptively act to prevent damage to the outer skin of the aircraft 8. For example, the aircraft 8 may be covered to prevent or oppose radiative cooling of its surface.

Apparatus, including the processor 26, for implementing the above arrangement, and performing the method steps to be described later below, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

Figure 3:
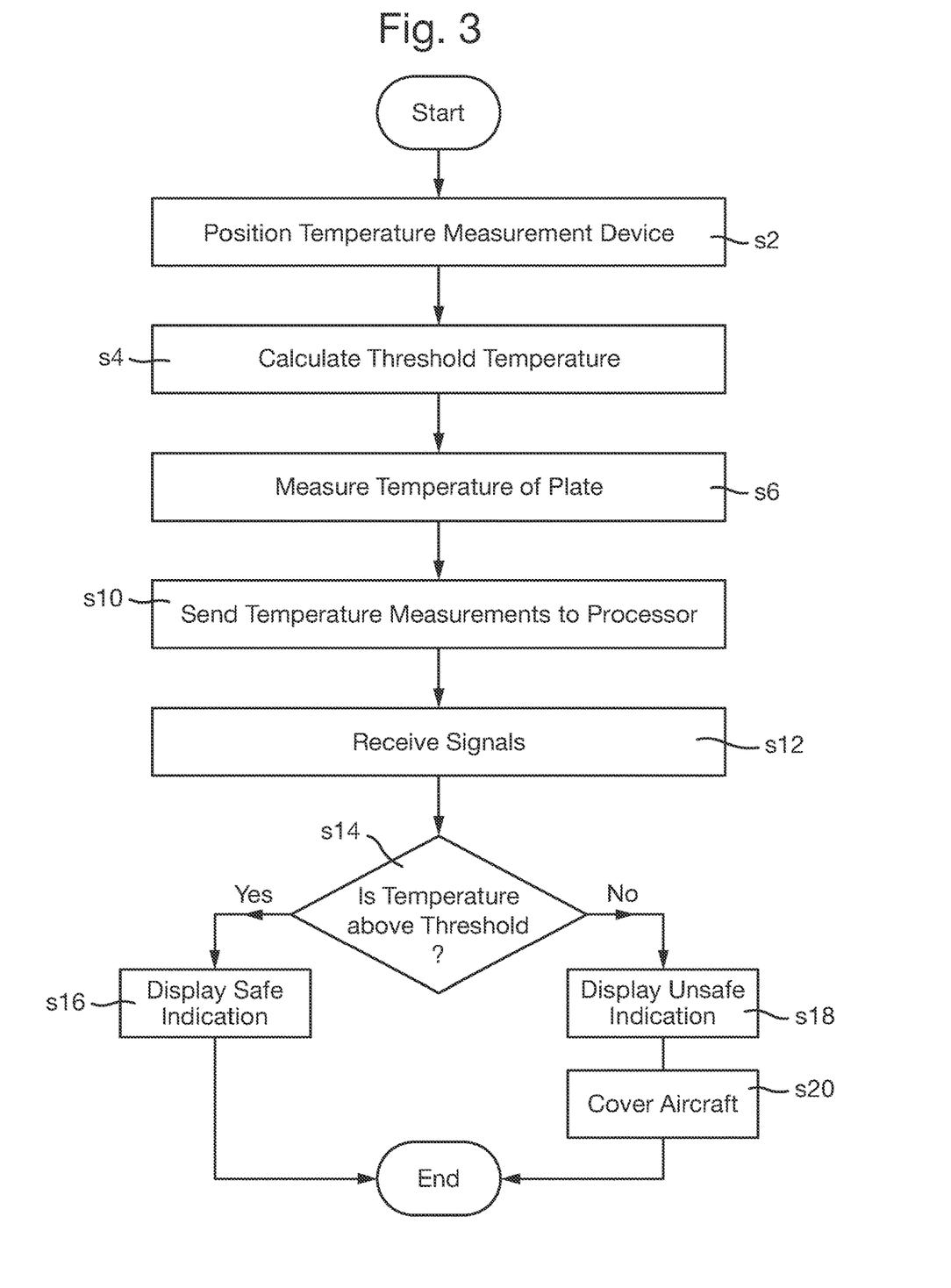
FIG. 3 is a process flow-chart showing certain steps of a method of operation of the temperature measurement device.

FIG. 3 is a process flow-chart showing certain steps of an embodiment of a method of operation of the temperature measurement device 4. The method of FIG. 3 may, for example, be performed periodically (e.g. at regular intervals), or continuously.

At step s2, the temperature measurement device 4 is positioned within a predetermined distance (e.g. 10 m) of the aircraft 8 in the environment 2.

At step s4, a threshold temperature $T^T$ at which a protective action is to be performed on the aircraft 2 is calculated. In this embodiment, this protective action includes covering the aircraft so as to prevent or oppose radiative cooling of the aircraft's surface. In other embodiments, a different protective action may be performed instead of or in addition to covering the aircraft 8, for example moving the aircraft 8 indoors.

In this embodiment, the threshold temperature $T^T$ is calculated using the following formula:

$$T^T = T^S + T^C + T^E + T^M$$

where:
- $T^S$ is the temperature at which damage may occur to the aircraft 8. In this embodiment, $T^S$ is the temperature at which ice forms on the external skin of the aircraft 8, i.e. $T^S = 0°$ C.;
- $T^C$ is a safety value, also known as a "clearance limit". This value represents a temperature range from $T^S$ within which the temperature of the aircraft skin should not fall. In this embodiment, $T^C = 1°$ C.;
- $T^E$ is a temperature value that accounts for system errors, such as measurement errors. In this embodiment, $T^E = 1°$ C.; and
- $T^M$ is a temperature value equal to an estimated maximum change in the temperature of the external skin of the aircraft 8 that may occur during covering the aircraft 8. In this embodiment, $T^M = 1°$ C.

In this embodiment, $T^T = 3°$ C.

At step s6, the thermocouples 22 measure the temperature of the plate 16.

At step s10, the thermocouples 22 send electrical signals corresponding to the temperature measurements of the plate 16 to the processor 26 via the wires 24.

At step s12, the processor 26 receives the electrical signals from the thermocouples 22.

At step 14, the processor 26 determines whether or not the measured temperature of the plate 16 is above the threshold temperature $T^T$.

If at step s14, the processor 26 determines that the measured temperature of the plate is above the threshold temperature $T^T$, the method proceeds to step s16.

However, if at step 14, the processor 26 determines that the measured temperature of the plate 16 is below the threshold temperature $T^T$, the method proceeds to step s18. Step s18 will be described in more detail later below after a description of step s16.

At step s16, the processor 26 displays, on the display 28, an indication that the external skin of the aircraft 8 is currently a "safe temperature". The terminology "safe temperature" may be understood to mean that there is no immediate risk of ice forming on the skin of the aircraft 8.

In this embodiment, responsive to the display of the indication that the external skin of the aircraft 8 is currently a "safe temperature", no covering of the aircraft 8 is performed.

After step s16, the method of FIG. 3 ends.

Returning to the case where, at step s14, the processor 26 determines that the measured temperature of the plate 16 is below the threshold temperature $T^T$, at step s18, the processor 26 displays, on the display 28, an indication that the external skin of the aircraft 8 is currently an "unsafe temperature". The terminology "unsafe temperature" may be understood to mean that there is a significant, immediate risk of ice forming on the outer skin of the aircraft 8.

At step s20, the user reads the display 28 and applies a cover to the aircraft 8 so as to prevent or oppose radiative cooling of the aircraft 8.

After step s20, the method of FIG. 3 ends.

Thus a method of operation of the temperature measurement device 4 is provided.

The above method is described for one time frame. In some embodiments, steps s6 to s20 may be repeated, for example, at desired intervals, or when a change in the temperature of the environment 2 is expected. In some embodiments, the temperature of the plate 16 is continually monitored using the thermocouples 22. The processor 26 may continuously determine whether or not the temperature of the plate 16 is above the threshold temperature $T^T$.

Figure 4:
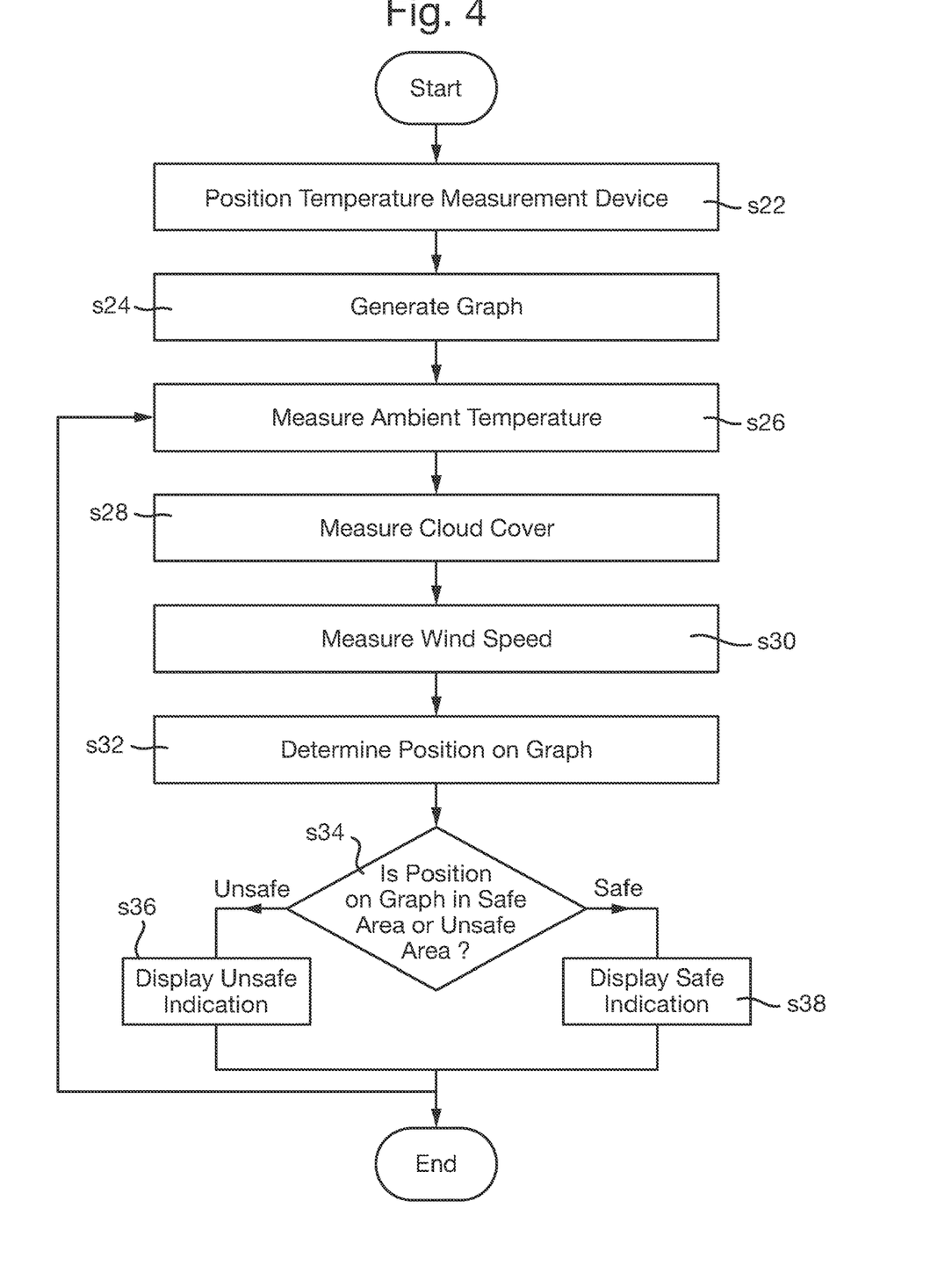
FIG. 4 is a process flow-chart showing certain steps of a further method of operation of the temperature measurement device.

FIG. 4 is a process flow-chart showing certain steps of a further embodiment of a method of operation of the temperature measurement device 4. In this embodiment, the temperature measurement device 4 is used to decide whether or not the aircraft 8 is to be uncovered, or moved outside from an indoor location.

At step s22, a user places the temperature measurement device 4 on the ground 6 in the environment 2. In this embodiment, initially, the aircraft 8 is not in the environment 2 and exposed to weather phenomena.

At step s24, using measurements taken by the temperature measurement device 4, a graph is generated.

Generation of the graph will now be described with reference to FIG. 5. The remaining steps of the process of FIG. 4 (i.e. steps s26 to s38) will be described in more detail later below after the description of FIG. 5.

Figure 5:
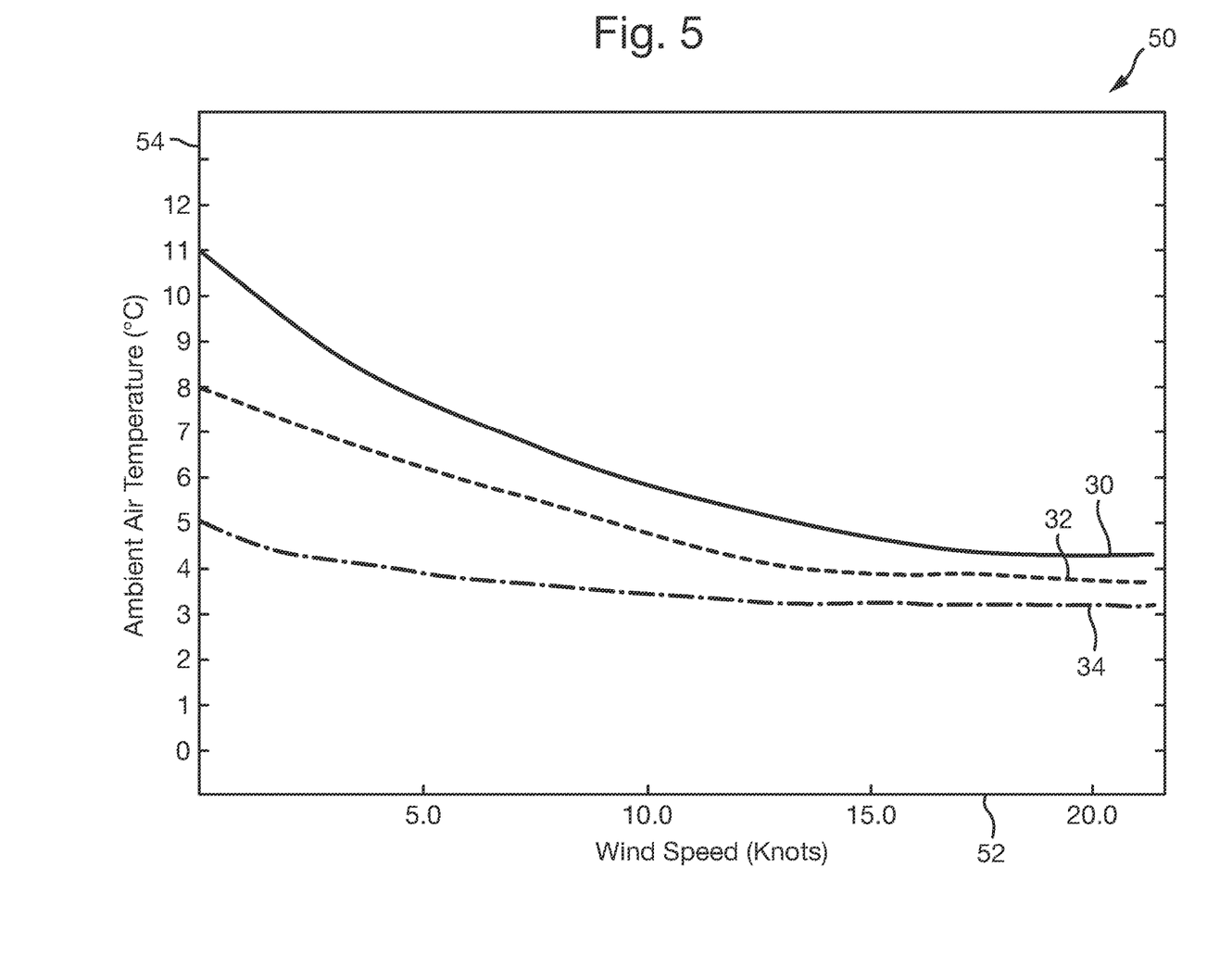
FIG. 5 is a schematic illustration (not to scale) of a graph.

FIG. 5 is a schematic illustration (not to scale) of the graph 50 generated at step s24.

The x-axis 52 of the graph 50 corresponds to a wind speed (in knots) in the environment 2.

The y-axis 54 of the graph 50 corresponds to an ambient air temperature (° C.).

The graph 50 includes three lines hereinafter referred to as "the first line" 30, "the second line" 32 and "the third line" 34.

In this embodiment, each of the first, second and third lines 30, 32, 34 indicated, for a respective different cloud cover condition, the ambient air temperature at which the temperature of the plate 16 is at the threshold temperature $T^T$ for a given wind speed. Each of the first, second and third lines 30, 32, 34 correspond to respective different cloud cover conditions. Cloud cover is often measured in oktas indicating how many eighths of the sky is covered by cloud. In this embodiment, the first line 30 corresponds to "clear sky" in which 0 oktas (0/8) of the sky is covered by cloud. The second line 32 corresponds to "half cloud-covered sky" in which 4 oktas (4/8) of the sky is covered by cloud. The third line 34 corresponds to "fully cloudy conditions" in which 8 oktas (8/8) of the sky is covered by cloud.

In other embodiments, the graph 50 may include one or more lines corresponding to one or more different cloud cover conditions instead of or in addition to those mentioned above. For example, in some embodiments, there are eight lines corresponding to 0, 1, 2, . . . , 8 oktas of cloud cover respectively.

In this embodiment, each of the lines 30-34 provides a respective threshold temperature for a respective different cloud cover condition.

For each line 30-34, the area on the graph 50 above that line 30-34 is deemed to be a "safe" area for the corresponding cloud cover. The safe area above a given line 30 comprises (x, y) pairs (i.e. pairs of wind speed measurements and plate temperature measurements) that indicate that, given the cloud cover conditions corresponding to that line 30-34, there is no significant immediate risk that ice would form on the aircraft skin if the aircraft 8 was exposed to the current measured conditions in the environment 2.

Similarly, for each line 30-34, the area on the graph 50 below that line 30-34 is deemed to be an "unsafe" area for the corresponding cloud cover. The unsafe area below a given line 30 comprises (x, y) pairs (i.e. pairs of wind speed measurements and plate temperature measurements) that indicate that, given the cloud cover conditions corresponding to that line 30-34, there is a significant immediate risk that ice would form on the aircraft skin if the aircraft 8 was exposed to the current measured conditions in the environment 2.

When the sky is clear, due to radiative cooling, objects tend to lose heat by radiative cooling more rapidly than when sky is partly cloudy or fully cloudy. Also, compared to lower wind speeds, higher wind speeds tends to mean that air temperature more heavily influences the surface temperatures of exposed objects than radiative cooling. These effects are reflected by the relative positions and gradients of the lines 30-34 in the graph 50.

The graph 50 may be generated, for example, by experimentation. For example, the graph 50, and the lines 30-34 thereon, may be generated by measuring cooling rates of the plate 16 under different wind speeds, air temperatures, and cloud cover conditions.

Steps s26 to s38 may be performed sometime after the generation of the graph 50, for example on a different day, and may be performed after the temperature measurement device 4 has been removed from the environment 2.

At step s26, the user acquires an ambient temperature measurement of the environment 2, for example using a thermometer in the environment 2. The temperature data may be input into the processor 26 by the user using a user interface.

In some embodiments, an ambient temperature for the environment 2 at a future time is acquired, for example from weather forecast data.

At step s28, the user acquires a measurement or an estimation of cloud coverage of the night sky 9 in the environment 2. Cloud coverage data may be input into the processor 26 by the user using a user interface.

In some embodiments, a cloud cover for the environment 2 at a future time is acquired, for example from weather forecast data.

At step s30, the user acquires a measurement of wind speed in the environment 2, for example using an appropriate measurement device. Wind speed data may be input into the processor 26 by a user using a user interface.

In some embodiments, a wind speed for the environment 2 at a future time is acquired, for example from weather forecast data.

At step s32, using the temperature measurement taken at step s26 and the wind speed data obtained at step s30, the processor 26 determines a position on the graph 50 corresponding to those measurements. In other words the process determines the (x, y) coordinates on the graph 50, where x is the measured wind speed, and y is the measured temperature of the plate 16.

At step s34, the processor 26 determines whether or not the determined (x, y) coordinates, are above or below the line 30-34 on the graph 50 that corresponds to the cloud cover measurements taken at step s28.

If it is determined that the determined (x, y) coordinates are below the line 30-34 corresponding to the measured cloud coverage, the method proceeds to step s36.

However, if it is determined that the determined (x, y) coordinates are above the line 30-34 corresponding to the measured cloud coverage, the method proceeds to step s38. Step s38 will be described in more detail later below after the description of step s36.

At step s36, the processor 26 displays, on the display 28, an indication that the current environmental conditions are "unsafe". The current environmental conditions being unsafe may be understood to mean that, were the aircraft 8 to be placed in the environment 2, due to radiative cooling there would be a significant immediate risk that the temperature of the external skin of the aircraft 8 drops to such an extent that ice forms on the skin.

In this case, the aircraft 8 may remain covered so that radiative cooling of the aircraft 8 is prevented or opposed.

After step s36, the method of FIG. 4 ends.

Returning to the case where, at step s34, it is determined that the determined (x, y) coordinates are above the line 30-34 corresponding to the measured cloud coverage, at step s38, the processor 26 displays, on the display 28, an indication that the current environmental conditions are "safe". The current environmental conditions being safe may be understood to mean that, were the aircraft 8 to be placed in the environment 2, there would be no significant immediate risk that the temperature of the external skin of the aircraft 8 drops to such an extent that ice forms on the skin.

In this case, the aircraft 8 may be uncovered and placed in the environment 2, for example, for testing.

After step s38, the method of FIG. 4 ends.

The method of FIG. 4 is described for one time frame. However, in some embodiments, steps s26 to s34 for example can be repeated as desired. In further embodiments, the cloud cover, the wind speed and/or the ambient temperature of the environment 2 can be periodically or continuously measured and the results processed by the processor 26 such that the processor 26 periodically or continuously determines whether the current environmental conditions are safe or unsafe for the aircraft 8.

It should be noted that certain of the process steps depicted in the flowcharts of FIGS. 3 and 4 and described above may be omitted or such process steps may be performed in a differing order to that presented above and shown in FIGS. 3 and 4. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the temperature measurement device is positioned on the ground. However, in other embodiments, the temperature measurement device is located in a different location, such as elevated above the ground.

In the above embodiments, the temperature measurement device is used to predict the surface temperature of the aircraft. However, in other embodiments, the temperature measurement device is used to predict the temperature of a different object, for example, a different type of vehicle or other apparatus.

In the above embodiments, the aircraft has an outer skin made of carbon fibre composite. However, in other embodiments, the aircraft's outer skin is made of a different material.

In the above embodiments, a single temperature measurement device is used. However, in other embodiments, outputs from multiple temperature measurement devices may be combined.

In the above embodiments, the base portion is made of polystyrene. However, in other embodiments, the base portion is made of a different thermally insulating material. In the above embodiments, the base portion is substantially cube shaped. In other embodiments, the base portion is a different shape. In the above embodiments, the base portion is 30 cm high, 30 cm long and 30 cm wide. However, in other embodiments the base portion has different dimensions.

In the above embodiments, the plate is made of aluminium. However, in other embodiments, the plate is made of a different thermally conductive material. In some embodiments, the plate is a different shaped item other than a plate. In the above embodiments, the plate is between 1 mm and 2 mm thick. However, in other embodiments the plate has a different thickness.

In the above embodiments, there are two thermocouples. However in other embodiments, there is a different number of thermocouples. In other embodiments, a different type of temperature sensor is used instead of or in addition to one or more of the thermocouples. In the above embodiments the thermocouples are located at or proximate to the centre of the upper surface of the plate. However, in other embodiments, the thermocouples are located in a different location on the plate. In the above embodiments, the thermocouples are bonded to the plate via an adhesive. However, in other embodiments, the thermocouples are bonded to the plate via other means. In the above embodiments, the thermocouples are coupled to the processor via wires. However, in other embodiments, the thermocouples are coupled to the processor via other means.

In the above embodiments, the plate is coated with a high emissivity coating. However, in other embodiments, the coating may be omitted. In such embodiments, the plate may be made of a high emissivity material.

In the above embodiments, the threshold temperature $T^T$ is calculated by using the above recited formula. However, in other embodiments, the threshold temperature $T^T$ is calculated in a different way, e.g. by adding in other variables or by excluding the aircraft clearance limit $T^C$.

In the above embodiments, the temperature measurement system is used to prevent the temperature of the aircraft from falling below the threshold temperature in order to prevent damage from ice forming on the skin of the aircraft. However, in other embodiments, the temperature measurement system is used to prevent the temperature of the aircraft from rising too high in order to prevent damage from solar heating.

In the above embodiments, the temperature measurement device and the aircraft are exposed to the night sky. However in other embodiments, the temperature measurement device and/or the aircraft are in a different environment, for example outside during the day. The aircraft may experience a net loss of heat to the environment by radiative cooling, although this may be compensated for or exceeded by solar heating.

The invention claimed is:

1. A temperature measurement device comprising:
a base portion;
a plate; and
a temperature sensor; wherein
the base portion comprises a first surface and a second surface opposite to the first surface, and one or more side walls disposed between the first surface and the second surface such that the first surface is spaced apart from the second surface;
wherein the first surface of the plate has an emissivity value of at least 0.8;
the base portion is more thermally insulating than the plate;
the plate comprises a first surface and a second surface opposite to the first surface;
the plate is disposed on the first surface of the base portion such that the second surface of the plate is in contact with the first surface of the base portion; and
the temperature sensor is coupled to the first surface of the plate such that the temperature sensor measures a temperature of the first surface of the plate.

2. The temperature measurement device according to claim 1, wherein the first surface of the plate has an emissivity value of at least 0.9.

3. The temperature measurement device according to claim 1, wherein the first surface of the plate has an emissivity value of at least 0.95.

4. The temperature measurement device according to claim 1, wherein the first surface of the plate is at least partially coated with a black coating.

5. The temperature measurement device according to claim 1, wherein the base portion is made of a plastic.

6. The temperature measurement device according to claim 1, wherein the plate is made of metal.

7. A system comprising;
a temperature measurement device according to claim 1; and
an object; wherein
an emissivity of the first surface of the plate is greater than or equal to an emissivity of the object.

8. The system according to claim 7, wherein the object is at least part of an external skin of an aircraft.

9. The system according to claim 7, the system further comprising one or more processors coupled to the temperature sensor, the one or more processors being configured to:
compare an output of the temperature sensor to a predetermined threshold temperature; and
provide, based on the comparison, for use by a user, an output.

10. A method of measuring a temperature, the method comprising:
providing a base portion, the base portion comprising a first surface and a second surface opposite to the first surface, and one or more side walls disposed between the first surface and the second surface such that the first surface is spaced apart from the second surface;
providing a plate, the plate comprising a first surface and a second surface opposite to the first surface, wherein the base portion is more thermally insulating than the plate;
fixing the plate to the base portion such that the second surface of the plate is in contact with the first surface of the base portion;
coupling a temperature sensor to the first surface of the plate, thereby providing a temperature measurement device;
positioning the temperature measurement device in an environment;
measuring, by the temperature sensor, a temperature of the first surface of the plate;
comparing a measurement taken by the temperature sensor to a predetermined threshold temperature; and
providing, based on the comparison, an output.

11. The method according to claim 10, wherein
the method further comprises:
measuring a wind speed in the environment;
measuring cloud cover in the environment; and
the predetermined threshold temperature is dependent upon the measured wind speed and cloud cover.

12. The method according to claim 10, wherein:
the environment contains an object;
the object is at least part of an external skin of an aircraft; and
the provided output is an indication of whether or not the object should be removed from the environment.

13. The method according to claim 12, wherein the predetermined threshold temperature is dependent upon a time period for removing the object from the environment.

* * * * *